United States Patent Office 3,426,071
Patented Feb. 4, 1969

3,426,071
METHOD OF PREPARING TETRAETHYLAM-
MONIUM DECAHYDRODECABORATE(2)
Gerald T. Hefferan, Butler, Pa., assignor to Mine Safety
Appliances Company, a corporation of Pennsylvania
No Drawing. Filed Jan. 22, 1968, Ser. No. 699,363
U.S. Cl. 260—567.6    2 Claims
Int. Cl. C07f 5/02

ABSTRACT OF THE DISCLOSURE

Tetraethylammonium decahydrodecaborate (2) is made by pyrolyzing tetraethylammonium octahydrotriborate in triethylamine borane solvent.

---

The co-pending application of Makhlouf and Hough, Ser. No. 579,220, now United States Patent No. 3,373,203 filed Sept. 14, 1966, of common ownership with this application, discloses the heating of tetraethylammonium octahydrotriborate to thermally decompose it to produce tetraethylammonium decahydrodecaborate.

In accordance with this invention, this thermal decomposition, or pyrolysis, is accomplished by heating a solution of tetraethylammonium octahydroborate in triethylamine. The use of the triethylamine borane solvent permits better temperature control as well as a somewhat lower reaction temperature than when pyrolyzing the solid salt. The solution pyrolysis, because the solution temperature is easily controlled and kept uniform throughout by conventional processing methods, is readily useable in large scale operations.

To illustrate this invention, 60.02 grams of

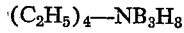

$(C_2H_5)_4$—$NB_3H_8$ and 118.31 grams of $(C_2H_5)_3NBH_3$ were placed under a nitrogen atmosphere in a glass reactor equipped with a stirrer and having an outlet discharging through a Dry Ice condenser and a wet test meter. The mixture was heated with stirring to 170–173° C.; solution occurred at 100–106° C. with gas evolution and a solid again precipitated at about 168° C. The reaction mixture was kept at 170–173° C. for six hours until gas evolution ceased.

Pyrolysis by-product triethylamine (0.14 mole) was recovered in the Dry Ice condenser and 22.4 liters of gases, primarily hydrogen and ethane, discharged through the wet test meter. The reaction mixture was cooled to room temperature and triethylamine borane solvent was filtered from the solid pyrolysis products, residual solvent being recovered by pentane wash. All of the triethylamine borane (118.23 g.) was recovered. The solid products (41 g.) were treated with hot water to separate a soluble fraction (29.1 g.) identified as $[(C_2H_5)_4N]_2B_{10}H_{10}$ by infrared analysis. The elemental analysis of the product was: B, 25.9 milliatoms (mats.)/g.; C, 41.0 mats./g.; N, 6.85 mats./g.; and H, 134.1 mats./g. compared to theoretical values of B, 26.4 mats./g.; C, 42.3 mats./g.; N, 5.3 mats./g.; and H, 132 mats./g.

The pyrolysis occurs at temperatures above about 170° C. and it is generally preferred to use temperatures between 170° C. and 180° C. The amount of solvent used is not critical to the operability of the method, but it is preferred to use at least enough solvent to completely dissolve the octahydroborate, suitably at least about 2 parts by weight of triethylamine borane for each part by weight of tetraethylammonium octahydroborate.

According to the provisions of the patent statutes, I have explained the principle and mode of practice of my invention and have described what I now consider to represent its best embodiment. However, I desire to have it understood that, within the scope of the appended claims, the invention may be practiced otherwise than as specifically described.

I claim:
1. A method of preparing tetraethylammonium decahydrodecaborate (2) that comprises thermally decomposing a solution of tetraethylammonium octahydrotriborate in triethylamine borane.
2. A method according to claim 1 in which the temperature is between about 170 and 180° C.

References Cited

UNITED STATES PATENTS 3,373,202  3/1968  Makhlouf et al. ____ 260—567.6
3,373,203  3/1968  Makhlouf et al. ____ 260—567.6

CHARLES B. PARKER, Primary Examiner.
S. T. LAWRENCE III, Assistant Examiner.

UNITED STATES PATENT OFFICE
CERTIFICATE OF CORRECTION

Patent No. 3,426,071                                                    February 4, 1969

Gerald T. Hefferan

It is certified that error appears in the above identified patent and that said Letters Patent are hereby corrected as shown below:

Column 1, line 12 and column 2, line 33, "decahydrodecaborate(2)" should read -- decahydrodecaborate(-2) --.

Signed and sealed this 17th day of March 1970.

(SEAL)
Attest:

Edward M. Fletcher, Jr.                                  WILLIAM E. SCHUYLER, JR.
Attesting Officer                                                 Commissioner of Patents